(12) United States Patent  (10) Patent No.: US 9,071,763 B1
Templeton et al.  (45) Date of Patent: Jun. 30, 2015

(54) UNIFORM ILLUMINATION IMAGE CAPTURE

(71) Applicant: Google Inc., Mountain View, CA (US)

(72) Inventors: Bradley Templeton, Sunnyvale, CA (US); Pierre-Yves Droz, Mountain View, CA (US)

(73) Assignee: Google Inc., Mountain View, CA (US)

( * ) Notice: Subject to any disclaimer, the term of this patent is extended or adjusted under 35 U.S.C. 154(b) by 105 days.

(21) Appl. No.: 13/627,080

(22) Filed: Sep. 26, 2012

(51) Int. Cl.
*H04N 5/222* (2006.01)
*H04N 5/235* (2006.01)
*G03B 15/05* (2006.01)

(52) U.S. Cl.
CPC ............. *H04N 5/2354* (2013.01); *G03B 15/05* (2013.01)

(58) Field of Classification Search
CPC ... H04N 5/2354; H04N 5/2256; G03B 15/05; G01A 17/89; G01N 21/8806
USPC .................................................. 348/370, 371
See application file for complete search history.

(56) References Cited

U.S. PATENT DOCUMENTS

| | | | |
|---|---|---|---|
| 4,427,276 A * | 1/1984 | Feinerman et al. | 396/61 |
| 5,029,009 A | 7/1991 | Ulich et al. | |
| 5,737,077 A | 4/1998 | Lee et al. | |
| 6,057,909 A * | 5/2000 | Yahav et al. | 356/5.04 |
| 6,138,915 A | 10/2000 | Danielson et al. | |
| 6,584,283 B2 | 6/2003 | Gabello et al. | |
| 6,707,054 B2 * | 3/2004 | Ray | 250/559.38 |
| 7,204,418 B2 | 4/2007 | Joseph et al. | |
| 7,738,678 B2 | 6/2010 | Breed et al. | |
| 7,787,131 B1 | 8/2010 | Moran | |
| 7,924,517 B2 | 4/2011 | Ambar et al. | |
| 8,096,676 B2 | 1/2012 | Gladnick et al. | |
| 8,227,754 B2 | 7/2012 | Peter et al. | |
| 8,228,506 B2 | 7/2012 | Bruls et al. | |
| 2002/0148947 A1 * | 10/2002 | Kakiuchi et al. | 250/208.1 |
| 2010/0252736 A1 | 10/2010 | Thorne et al. | |

OTHER PUBLICATIONS

Charge-coupled device—Wikipedia, the free encyclopedia; www.en.wikipedia.org/wiki/Charge-coupled_device; 9 pages; 2012.
Intensified CCD Cameras—ICCD Structure—ICCD Camera—Andor Learning; www.andor.com/learning/digital_cameras/?docid=326; 4 pages; 2012.
Laser power scaling—Wikipedia, the free encyclopedia; www.en.wikipedia.org/wiki/Laser_power_scaling; 2 pages; 2012.

* cited by examiner

*Primary Examiner* — Antoinette Spinks
(74) *Attorney, Agent, or Firm* — McDonnell Boehnen Hulbert & Berghoff LLP (57) ABSTRACT

Methods and systems are provided for capturing an image having uniform illumination over a range of distances. The system may include a light source, a light sensing array, and an electronic circuit. The method may involve selecting a range of distances from the system, causing the light source to generate a light pulse with a modulated decay, and using the light sensing array to sense an integrated intensity of a reflected light pulse during an exposure time. The reflected light pulse may be provided by the generated light pulse reflecting from an object located at an object distance within the range of distances. The exposure time may be controlled based on the range of distances and the modulated decay such that the integrated intensity of the reflected light pulse is substantially independent of the object distance.

18 Claims, 5 Drawing Sheets

UNIFORM ILLUMINATION IMAGE CAPTURE

BACKGROUND

Unless otherwise indicated herein, the materials described in this section are not prior art to the claims in this application and are not admitted to be prior art by inclusion in this section.

In recent years, along with the advancement of consumer electronics technology, cameras have become increasingly accessible. In one aspect, high end, professional grade cameras, such as single-lens reflex (SLR) cameras have become more affordable. In another aspect, high resolution digital cameras have become a standard feature in mobile electronic devices such as mobile phones.

In light of the increased accessibility of cameras and the increasing role of photographs in our daily lives, innovations in image capture technology continue to be welcome. In particular, solutions to common image capture issues may be desired. For example, when a user captures an image of an object while using a camera flash, the resulting image may show a brightly-lit object against a dark background, and may not properly portray a scene the user wished to capture. As such, innovations may be applicable to provide substantially uniform illumination of objects in a range of distances, when capturing an image while using a camera flash.

SUMMARY

This disclosure may disclose, inter alia, methods and systems for uniform illumination image capture. Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in any processes or methods described herein. In still further examples, any type of devices may be used or configured to perform logical functions in any processes or methods described herein. In yet further examples, any type of devices may be used or configured as means for performing functions of any of the methods described herein (or any portions of the methods described herein).

In one aspect, a method is provided. The method may involve selecting a range of distances from an image capture device. The image capture device may include a light source and a light sensing array. The method may also involve causing the light source to generate a light pulse with a modulated decay. The light pulse reflects from an object located at an object distance within the range of distances to provide a reflected light pulse. The method may further involve using the light sensing array to sense an integrated intensity of the reflected light pulse during an exposure time. The exposure time is controlled based on the range of distances and the modulated decay such that the integrated intensity of the reflected light pulse is substantially independent of the object distance.

In another aspect, an image capture device is provided. The image capture device may include a light source, a light sensing array, and a electronic circuit. The electronic circuit may be configured to select a range of distances from the image capture device, and cause the light source to generate a light pulse with a modulated decay. The light pulse reflects from an object located at an object distance within the range of distances to provide a reflected light pulse. The electronic circuit may be further configured to use the light sensing array to sense an integrated intensity of the reflected light pulse during an exposure time. The exposure time is controlled based on the range of distances and the modulated decay such that the integrated intensity of the reflected light pulse is substantially independent of the object distance.

In a further aspect, a non-transitory computer-readable medium having instructions stored thereon is provided. The instructions may be executable by a computing device to cause the computing device to perform functions including selecting a range of distances from an image capture device. The image capture device may include a light source and a light sensing array. The instructions may be executable by the computing device to cause the computing device to perform functions also including causing the light source to generate a light pulse with a modulated decay. The light pulse reflects from an object located at an object distance within the range of distances to provide a reflected light pulse. The instructions may be executable by the computing device to cause the computing device to perform functions further including using the light sensing array to sense an integrated intensity of the reflected light pulse during an exposure time. The exposure time is controlled based on the range of distances and the modulated decay such that the integrated intensity of the reflected light pulse is substantially independent of the object distance.

These as well as other aspects, advantages, and alternatives, will become apparent to those of ordinary skill in the art by reading the following detailed description, with reference where appropriate to the accompanying drawings.

DETAILED DESCRIPTION

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

In example embodiments, an image capture device can be used to capture an image of one or more objects, such that the brightness of the one or more objects in the image is substantially independent of distance from the image capture device, within a range of distances.

Figure 1:
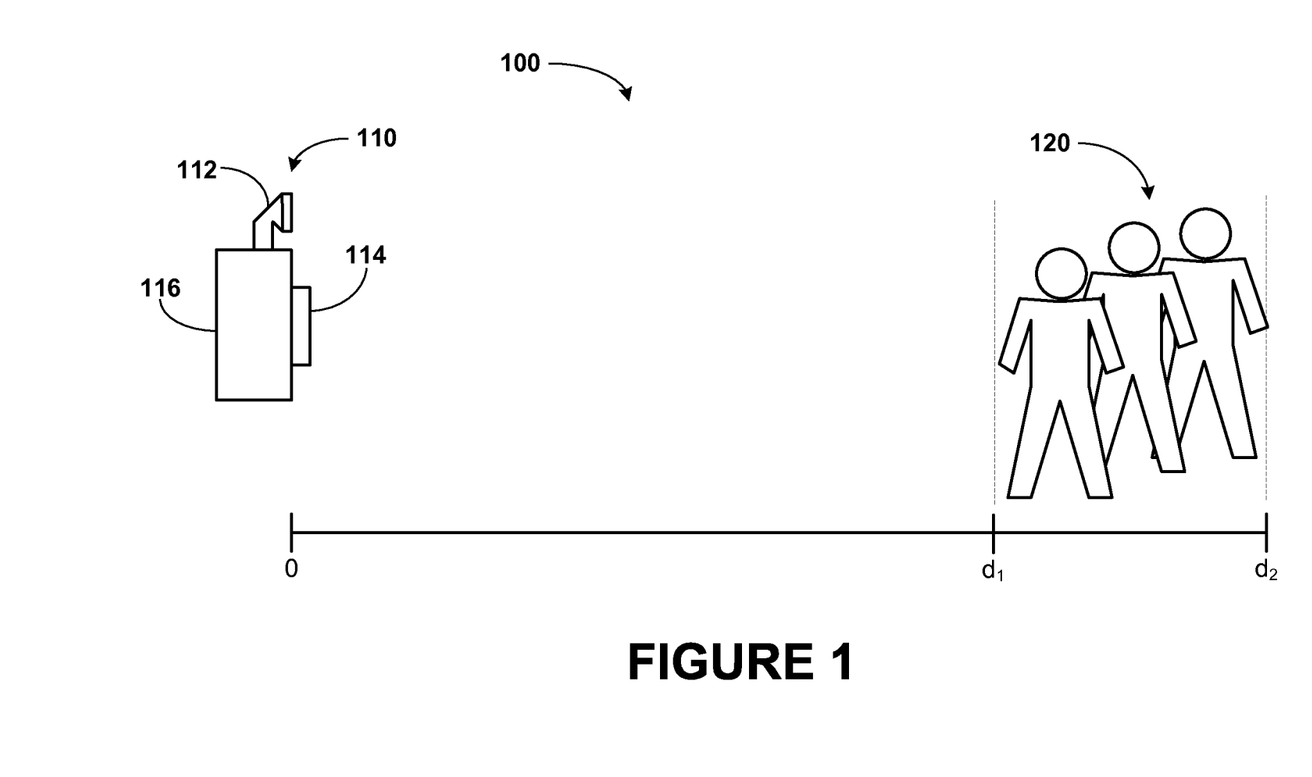
FIG. 1 shows an image capture scenario, in accordance with an example embodiment.

FIG. 1 illustrates an example scenario 100 involving an image capturing device 110 provided to capture an image of a group of people 120. As shown, the image capturing device 110 may include a light source 112, a light sensing array 114, and a processing component 116. In one example, the light source 112 may be configured to generate a light pulse, the light sensing array 114 may be configured to capture the image by detecting light reflected from the group of objects, and the processing component 116 may be configured to control the light source 112 and light sensing array 114, and process the detected light.

In the example scenario 100, the group of people 120 may occupy a range of distances $d_1$ to $d_2$ from the image capturing device 110. As such, the light pulse generated by the light source 112 as a camera flash will travel the distance $d_1$, reflect off the front of the group of people 120, and travel back to the image capturing device 110 and be detected by the light sensing array 114. In other words, the light pulse will have travelled a total distance of approximately $2 \cdot d_1$ between being generated and being detected. Similarly, the light pulse reflected off people in the back of the group of people 120 will have traveled a total distance of approximately $2 \cdot d_2$ between being generated and being detected.

According to the inverse-square law, the intensity of a light pulse is inversely proportional to the square of the distance from the source of the light pulse. In the example scenario 100, light reflected off people in the back of the group of people 120 will have traveled $2 \cdot (d_2 - d_1)$ further than light reflected off the front of the group of people 120. As such, if a square light pulse is generated by the light source 112 and reflected off of the group of people 120, the light reflected off the front of the group of people 120 will be of higher intensity when detected by the light sensing array 114 than the light reflected off people in the back of the group of people.

Figure 2A:
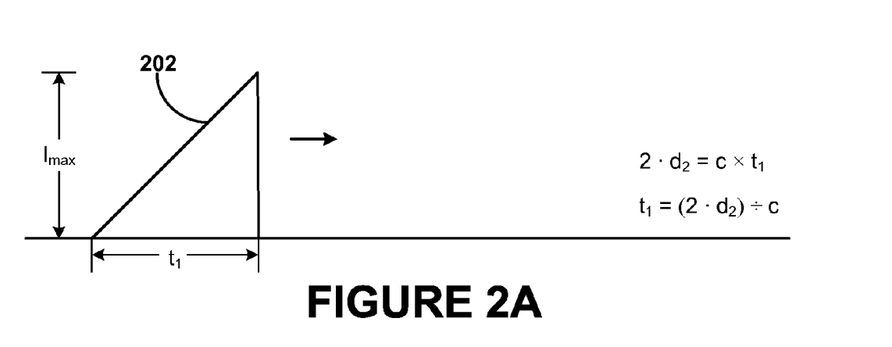
FIG. 2A shows a generated light pulse, in accordance with an example embodiment.
Figure 2B:
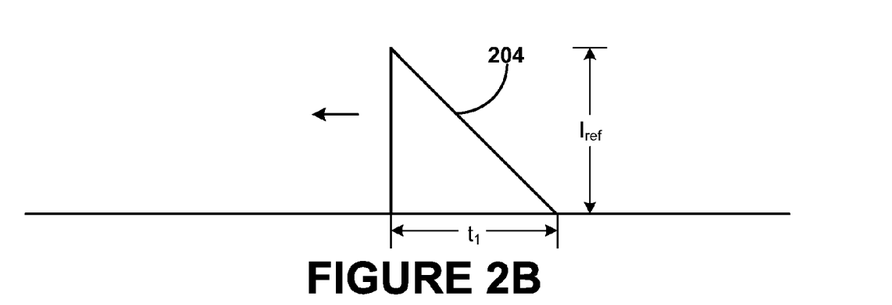
FIG. 2B shows a reflected light pulse, in accordance with an example embodiment.

FIG. 2A shows an example light pulse 202 which may be generated as a camera flash for capturing an image. The light pulse 202 may be generated by the light source 112 of FIG. 1. As shown, the light pulse 202 may be traveling from an image capture device such as the image capture device 110 of FIG. 1, towards an image capture object, such as the group of people 120 in FIG. 1. Also shown, the light pulse 202 may have a maximum intensity of $I_{max}$ and a pulse length of $t_1$. As opposed to a square pulse, the example light pulse 202 may have a modulated decay, such that the intensity decays from the maximum intensity of $I_{max}$ to zero at the end of the pulse. In this case, the light pulse 202 may have a linear decay. In one example, the pulse length $t_1$ may be determined based on the range of distances the image capture object may be from the image capturing device. In the case of example scenario 100 of FIG. 1, $t_1$ may be calculated based on the distance $d_2$. For instance, $t_1$ may be calculated as $(2 \cdot d_2)/c$, where c is the speed of light. In other words, the pulse length $t_1$ equals the time taken for light to travel from the light source to and back from the distance $d_2$. FIG. 2B shows a reflected light pulse 204 moving back towards the image capturing device, after the light pulse 202 is reflected off of an image capture object at a distance d from the image capture device. In this example, d is less than $d_2$, which may be the maximum distance within which distance-independent illumination may be provided in a captured image. As shown, the reflected light pulse 204 has an intensity that decays from $I_{ref}$ to zero over the pulse length $t_1$.

Figure 2C:
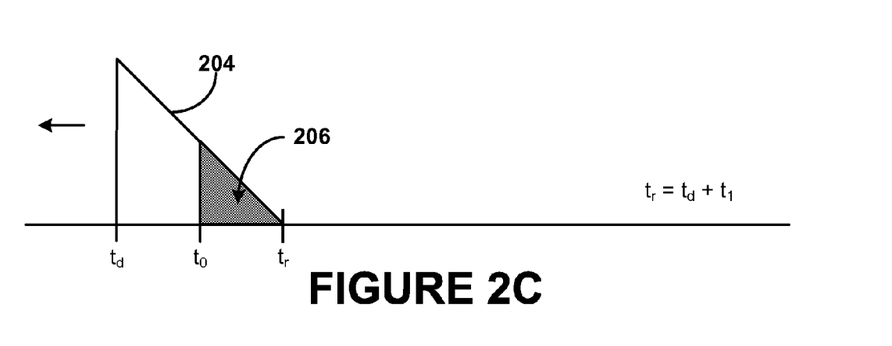
FIG. 2C shows a detected light pulse, in accordance with an example embodiment.

FIG. 2C shows the reflected light pulse 204 being detected by a light sensing array, such as the light sensing array 114 of FIG. 1. The light sensing array may be configured to integrate the intensity of the detected light over a time during which the light sensing array is exposed to the reflected light pulse. The light sensing array may then generate a signal based on the integrated intensity of the detected light.

As shown, an exposure time, which may be defined by an opening and closing of a shutter, may begin at $t_0$. In one case, the exposure time may be configured to end $t_0+t_1$ or later, for an exposure duration of at least $t_1$, which is the pulse length of the reflected light pulse 204 being detected. In one example, $t_0$ may be set as $t_1$, which is the length of the light pulse calculated above, based on the distance $d_2$. In other words, the shutter of the light sensing array opens at the same time the generated light pulse 202 at the light source decays to zero. As defined above, $t_1$ represents the time taken for light to travel to and back from the distance $d_2$. Accordingly, because the reflected light pulse 204 is reflected off of an image capture object at a distance d within the distance $d_2$ from the image capture device, the reflected light pulse 204 may begin to arrive at the light sensing array of the image capture device at a time $t_d$, before $t_0$ when the shutter opens. In this case, $t_d$ may be calculated as $(2 \cdot d)/c$, where d, as defined above, is the distance of the image capture object reflecting the reflected light pulse 204. Also shown in FIG. 2C is that the reflected light pulse 204 may decay to zero at a time $t_r$. Given that the reflected light pulse 204 has a pulse length of $t_1$, $t_r$ may be represented as $t_d+t_1$ or $(2 \cdot d)/c+t_1$. As a result of the reflected light pulse 204 arriving at the light sensing array at the time $t_d$, before the shutter opens at $t_0$, the light sensing array only detects a portion of the reflected light pulse 204, as indicated in the shaded portion 206.

Mathematically, the signal generated by the light sensing array based on the detected light can be represented as:

$$S = \int_{t_0}^{t_r} I(t) \, dt \tag{1}$$

where I(t) represents the intensity of the reflected light pulse 204 as a function of time, $t_0$ represents when the exposure of the light sensing array begins, and $t_r$ represents when the reflected light pulse 204 decays to zero. In other words, S represents the area of the shaded portion 206 of FIG. 2C.

In this case, the reflected light pulse 204, having a linear decay from a maximum intensity of $I_{ref}$ and arriving at the light sensing array at time $t_d$ as discussed above, may be mathematically represented as:

$$I(t) = I_{ref} \cdot \frac{t_r - t}{t_r - t_d} = I_{ref} \cdot \frac{t_r - t}{t_1} \tag{2}$$

given that $t_r-t_d=t_1$, as discussed above. Accordingly, the signal generated by the light sensing array may be represented as:

$$S = \frac{I_{ref}}{t_1} \cdot \int_{t_0}^{t_r} (t_r - t)\,dt \qquad (3)$$

$$= \frac{I_{ref}}{t_1} \cdot \left(t_r \cdot t - \frac{t^2}{2}\right), \text{ for } t_0 \le t \le t_r \qquad (4)$$

$$= \frac{I_{ref}}{t_1} \cdot \frac{1}{2}(t_r - t_0)^2 \qquad (5)$$

As discussed previously, the shutter open time $t_0$ may be set as $t_1$, when the generated light pulse 202 at the light source decays to zero, and $t_r$, the time the reflected pulse 204 decays to zero, may be calculated as $t_d+t_1$. Accordingly, $t_r-t_0=t_d$, which may further be represented as $(2 \cdot d)/c$, as also discussed above. As such, the signal generated by the light sensing array may be simplified and represented as:

$$S = \frac{I_{ref}}{t_1} \cdot \frac{1}{2}\left(\frac{2d}{c}\right)^2 = \frac{2d^2 I_{ref}}{c^2 t_1} \qquad (6)$$

As mentioned before, the intensity of a light pulse is inversely proportional to the square of the distance from the source of the light pulse, such that the relationship may be represented as:

$$I \propto \frac{1}{4d_2^2} \qquad (7)$$

Applying the inverse-square law relationship of equation (7) to equation (6) above, the signal generated from the detected light pulse, including considerations for the inverse-square law, may be represented as:

$$S \propto \frac{1}{2c^2 t_0} = \frac{1}{4cd_2} \qquad (8)$$

As shown in equation (8), the detected intensity of the reflected light pulse is independent of the distance d, up to the distance $d_2$. In other words, in the case a camera flash light pulse is generated and detected by a light sensing array in the manner discussed above, the amount of light reflected off image capture objects within a range of distances from the image capture device and detected by the light sensing array of the image capture device may be substantially uniform. In one example, the generated light pulse may have a modulated decay. In particular, the modulated decay of the light pulse may be a linear decay, such as that of the light pulse 202 of FIGS. 2A-2C and represented by equation (2). In another example, the modulated decay of the light pulse may be a substantially linear decay.

In other example embodiments, different light pulse shapes and different light sensing array configurations may also be implemented to achieve uniform illumination image capture. For example, a sensitivity of the light sensing array may be modulated based on the range of distances along with, or instead of, modulating the light pulse to achieve uniform illumination image capture. In other words, if the light pulse is represented as P(t) and the sensitivity of the light sensing array is represented as A(t), uniform illumination image capture may be achieved so long as an integral of the product of $P(t_1-t)$ and $A(t_1+t)$ is proportional to the square of the distance d, up to $d_2$, given that P(t) decays to zero after a pulse length of $t_1$, and/or A(t) begins at zero at $t_0$, when light reflected from the distance $d_2$ begins to arrive at the light sensing array. This way, once the inverse-square law is applied, the detected intensity of the reflected light pulse is independent of the distance d, up to the distance $d_2$.

In the case discussed above, where the generated light pulse has a linear decay and a pulse length of $t_1$, the sensitivity of the light sensing array, as implemented, may effectively be in the form of a square, unity gain function between the times $t_0$ and $t_0+t_1$. In another case, a rectangular light pulse may be generated by the light source, and the sensitivity of the light sensing array may be in the form of a linear, or substantially linear, ramp function, timed based on the range of image capture object. In yet another case, a light pulse having a modulated nonlinear decay may be generated by the light source, and the sensitivity of the light sensing array may be in the form of a modulated nonlinear increasing function. Whichever the case, if the product of $P(t_1-t)$ and $A(t_1+t)$ is substantially linear such that the integral is substantially proportional to the square of the distance d, substantially uniform illumination image capture may be achieved for the distance d, up to the distance $d_2$.

Implementation of an image capture device for uniform illumination image capture as discussed above may involve coordination between a light source, such as the light source 112 of FIG. 1, configured to generate light pulses with modulated decays, and a light sensing array, such as the light sensing array 112 of FIG. 1, configured to detect reflected light within a particular time frame. Example image capture device components and image capture methods for uniform illumination image capture are further discussed in the following sections.

Figure 3:
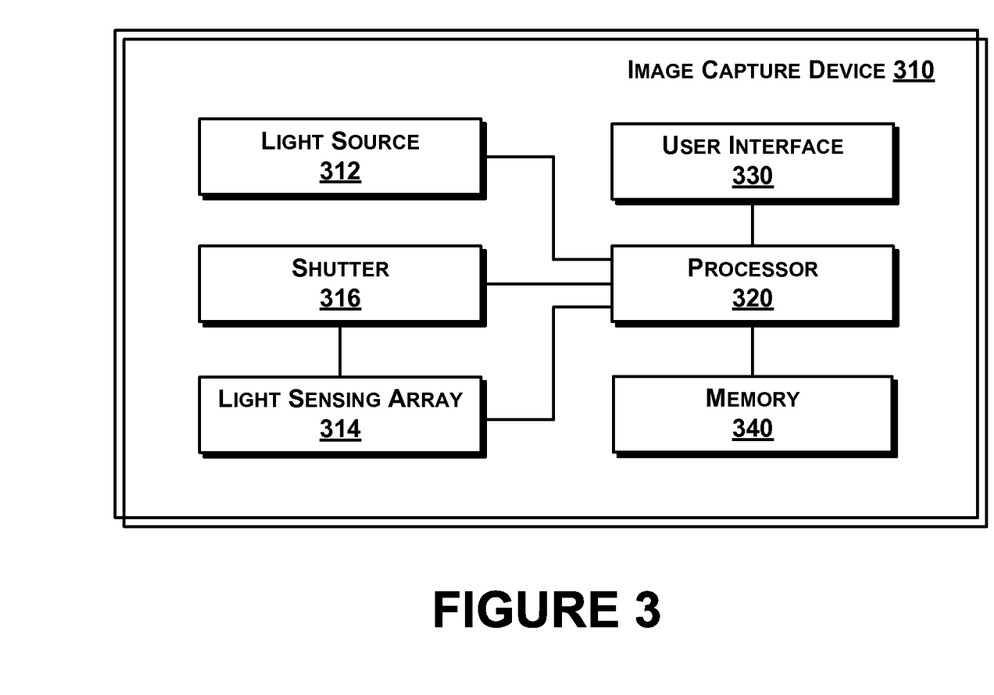
FIG. 3 is a simplified block diagram of an image capture device, in accordance with an example embodiment.

As indicated above, an image capture device may be configured for uniform illumination image capture. FIG. 3 shows a simplified block diagram of an example image capture device 310. In one example, the image capture device 310 may be implemented as the image capture device 110 of FIG. 1. As shown, the image capture device 310 may include a processor 320, a user interface 330, a memory 340, a light source 312, a light sensing array 314, and a shutter 316. Each of the components in the image capture device 310 may be in communication with other components in the image capture device 310 either directly or via the processor 320. In one case, the processor 320 may be alternatively be an electronic circuit, such as an analog electronic circuit configured to receive signals from and provide signals to other components in the image capture device 310.

In one example, the light source 312 may be implemented as the light source 112 of FIG. 1. As such, the light source 312 may be configured to generate a light pulse with a modulated decay. In one example, the light source may include a light emitting diode (LED), and a light pulse may be generated by providing the LED with an electric current. Accordingly, the decay of the light pulse may be modulated by controlling the amount of current provided to through the LED. In one case, the LED may be configured to provide 2-4 watts of power.

In another example, the light source may include a laser diode. Similarly, a light pulse may be generated by providing the laser diode with an electric current, and the decay of the light pulse may be modulated by controlling the provided current. Further, the output of the laser diode may be scaled using a master oscillator power amplifier (MOPA). In this case, the MOPA-scaled laser diode may be configured to provide 20-40 watts of power.

In a further example, the light source may include both the LED and the MOPA-scaled laser diode. In this case, one or both of the LED or MOPA-scaled laser diode may be selected to generate a light pulse having a modulated decay based on image capture factors. Image capture factors may include ambient light and a distance of an image capture object from the image capture device.

In one example, the light sensing array 314 may be implemented as the light sensing array 114 of FIG. 1. As such, the light sensing array 314 may be configured to detect light reflected from an image capture object. In one example, the light sensing array 314 may include a charge-coupled device (CCD) configured to further convert the detected light into a digital photographic image. In operation, the CCD may be an array of charge wells that accumulate electrons that have been received. The charges stored in the array of charge well may then be measured and converted into the digital photographic image. The light sensing array 314 may further include, or be coupled with, the shutter 316 configured to control exposure of the light sensing array 314 to the reflected light.

For instance, the CCD of the light sensing array 314 may be a frame transfer CCD or an intensified charge-coupled device (ICCD). In one example, the ICCD may be a CCD that is optically connected to an image intensifier mounted between the CCD and the incoming light which has been reflected off the image capture object. The image intensifier may include a photocathode, and micro-channel plate (MCP) and a phosphor screen. In operation, the photocathode may be configured to receive the incoming light, and accordingly generate photoelectrons from the photons. The photoelectrons may then be accelerated towards the MCP based on a control voltage applied between the photocathode and the MCP, after which the photoelectrons may be multiplied by the MCP before being converted back to photons detectable by the CCD. On the other hand, reversing the control voltage between the photocathode and the MCP may accelerate the photoelectrons back towards the photocathode, resulting in the CCD receiving no photons at all.

As such, the control voltage applied between the photocathode and the MCP may be configured to control whether, and to what degree the CCD is exposed to the received photons. In other words, the image intensifier may be configured as the shutter 316 for controlling exposure of the light sensing array 314 to the reflected light. In one example, the image intensifier may be configured as an exposure on/off switch for the CCD implemented as a light sensing array, as discussed above. In some cases, gating times (or shutter speeds) of an ICCD implemented light sensing array 314 may be in the range of 2 nanoseconds. In some other cases, gating times of an ICCD may be as short as 200 picoseconds. In another example, the image intensifier may be configured to modulate the amount of photoelectrons detectable by the CCD, thereby modulating the sensitivity of the CCD implemented as the light sensing array, as also discussed above.

In one example, the processor 320 may be configured to provide control inputs to the light source 312 and the light sensing array 314. In one case, the processor 320 may be configured to cause an electric current to be provided to the LED and/or laser diode of the light source 312 for generating a light pulse. In another case, the processor 320 may be configured to cause a control voltage to be provided to the image intensifier or shutter 316 of the light sensing array 314 to control exposure of the light sensing array 314 to the reflected light.

The processor 320 may further be configured to communicate with the user interface 330 and the memory 340. In one case, the processor 320 may be configured to transmit to the user interface 330 information to be provided to a user. In this case, the processor 320 may further be configured to receive user input from the user interface 330. In another case, the processor 320 may be configured to transmit to the memory 340 data to be stored temporarily or permanently. In this case, the processor 320 may further be configured to receive data from the memory 340 as necessary for the operation of the image capture device 310. As suggested above, these functions performed by the processor 320 may alternatively be executed by an electronic circuit, such as an analog electronic circuit.

In one example, the user interface 330 may include a display for providing information to a user of the image capture device 310, and may include input means for receiving user input. For example, the user interface 330 may include buttons via which the user may provide input. In one case, the buttons may be physical buttons provided on an external structure of the image capture device 310. In another case, the buttons may be graphic icons provided on a touchpad. In this case, the touchpad may be a part of a touchscreen, which may further be configured as the display for providing information to the user. In either case, the user interface 330 may include a "shutter" button or "trigger" button to activate image capture.

In one example, the memory 340 may be configured to store image capture settings, user information, and/or images captured by the image capture device 310. Further, the memory 340 may be a non-transitory computer readable medium having program instructions stored thereon and executable by the processor 320 to control and coordinate functions of the other image capture device components such as the light source 312 and light sensing array 314 for uniform illumination image capture. Example methods which may be embodied in the program instructions are further discussed below.

Figure 4:
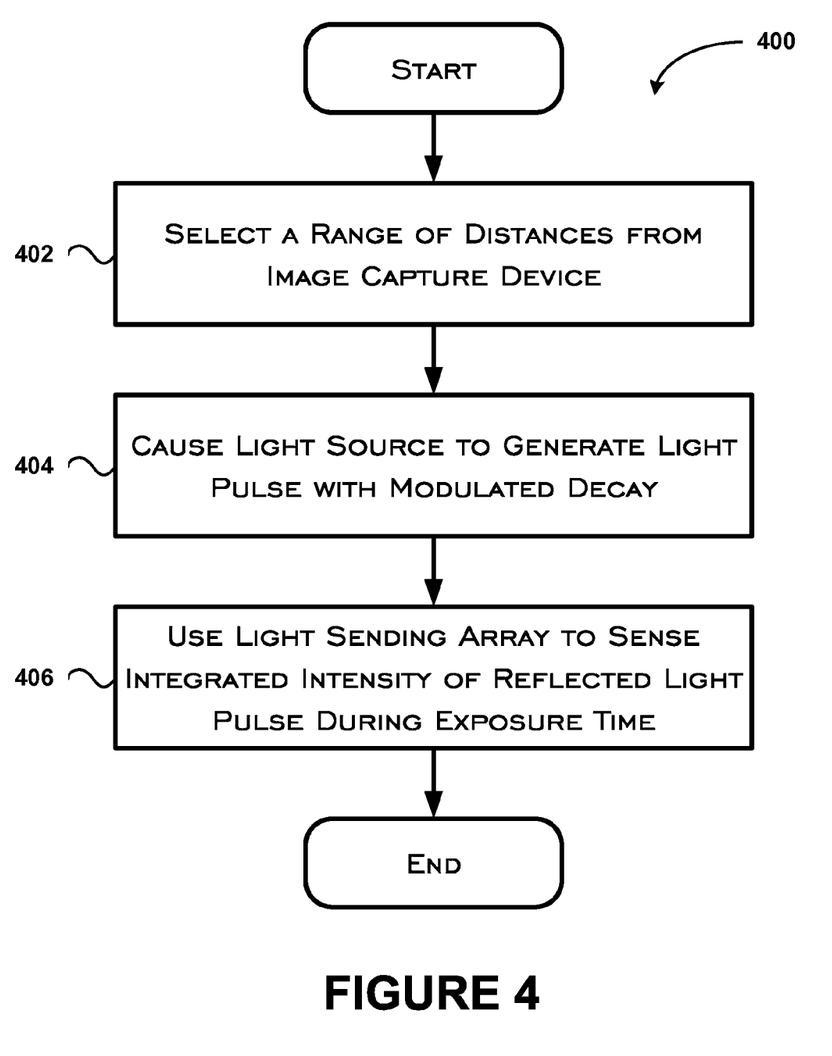
FIG. 4 is a flowchart depicting a method for capturing an image having substantially uniform illumination over a range of distances, in accordance with an example embodiment.

FIG. 4 shows a flowchart depicting an example method 400 implemented on an image capturing device for capturing an image having uniform illumination over a range of distances. In one example, the method 400 may be implemented on the image capture device 110 of FIG. 1 or the image capture device 310 of FIG. 3. Method 400 shown in FIG. 4 presents an embodiment of a method that could be implemented on the image capture device 110 discussed above, and may be performed by a computing device, such as the processing component 116 of FIG. 1, or the processor 320 of FIG. 3.

Method 400 may include one or more operations, functions, or actions as illustrated by one or more of blocks 402-406. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor or electronic circuit for implementing specific logical functions or steps in the process.

The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

At block 402, the method 400 may involve selecting a range of distances from an image capture device. The range of distances may be selected based on an image capture object distance, such that the range of distances includes the image capture object distance. Referring back to FIG. 1, the image capture device 110 may be configured to capture an image of the group of people 120. In one example, the group of people 120 may be at a distance of up to 25 feet away. As such, a range of distances of 0 to 25 feet may be selected.

In one case, selecting the range of distances may be based on an input from a user of the image capture device 110. For instance, the user may indicate via a user interface of the image capture device 110, such as the user interface 330 of FIG. 3, a range of distances for which the user wishes to capture a uniformly illuminated image.

In another case, selecting the range of distances may be based on a detected distance of an image capture object from the image capture device 110. In this case, the image capture device 110 may further include a distance detection component for determining the detected distance. In one example, the distance detection component may determine the detected distance optically. For instance, the distance detection component may shine a light or point a laser at the image capture object, detect the reflected light or laser beam, and calculate a distance of the image capture object based on a time taken for the light or laser beam to travel to and from the image capture object.

At block 404, the method 400 may involve causing a light source, such as the light source 112 of FIG. 1 or the light source 312 of FIG. 3, to generate a light pulse with a modulated decay. As discussed above, the light source 312 may include an LED and/or a MOPA-scaled laser diode, and the light source 312 may be configured to generate a light pulse by providing the LED and/or laser diode with an electric current. Accordingly, the decay of the light pulse may be modulated by controlling the amount of current provided to through the LED and/or laser diode.

Also as discussed above, a pulse length of a pulse generated by the light source 112 or 312 may be determined according to the range of distances selected at block 402 of the method 400. For instance, referring back to the distance $d_2$ shown in FIG. 1, and the light pulses 202 and 204 of FIG. 2A-2C, the pulse length of the generated light pulse, $t_1$ may be calculated as $2 \cdot d_2/c$, as previously provided. In the case $d_2$ is 25 feet, or approximately 7.5 meters, $t_1$ is approximately 50 nanoseconds.

At block 406, the method 400 may involve using a light sensing array, such as the light sensing array 114 of FIG. 1 or the light sensing array 314 of FIG. 3, to integrate an intensity of the reflected light pulse during an exposure time. As discussed above, the light sensing array may be a CCD. In this case, the integrated intensity of the reflected light pulse may then be the measured charge stored in the array of charge wells. Operatively, the light sensing array may be configured such that the integrated intensity of a generated light pulse reflected off of an image capture object is substantially independent of the image object distance within the selected range of distances.

As discussed previously, the light sensing array 314 may include an ICCD, and the image intensifier of the ICCD may be configured as the shutter 316 for the underlying CCD. In such a case, the exposure time may be controlled by controlling a control voltage across the photocathode and the MCP of the image intensifier, as previously described.

In one example, the exposure time may be determined based on the selected range of distances and the modulated decay. For instance, as discussed above, the exposure time may be configured such that the shutter (in the form of the ICCD image intensifier) opens at the same time the generated light pulse 202 at the light source decays to zero. In the case, the pulse length $t_1$ of the generated light pulse is calculated as $2 \cdot d_2/c$, this is also when a reflected light pulse reflected from the distance $d_2$ arrives at the image capture device. In one case, the shutter may be configured to open at $t_0$, and close at $t_0+t_1$.

In this way, uniform illumination image capture may be provided for everything at a distance d between the image capture device and the distance $d_2$. Continuing with the previous example, where $d_2$ is 25 feet, and the pulse length $t_1$ is calculated as approximately 50 nanoseconds, the shutter may then be configured to open around 50 nanoseconds after the beginning of the light pulse was generated. In other words, as discussed previously, the shutter may be configured to open when the generated light pulse has decayed to zero. The shutter may then remain open for around 50 nanoseconds.

In a further example, the amount of light detected by a light sensing array, such as light sensing array 114 and light sensing array 312 may be relatively low due to the short exposure time. As such, blocks 404 and 406 of the method 400 may be repeated, and the amount of light detected by the light sensing array may be aggregated to produce a photographic image. In the illustrative example discussed above having a 50 nanosecond exposure time (with $d_2$=25 feet), thousands of exposures may occur in one millisecond.

In either example, the exposure times of the light sensing array may be coordinated with the generation of light pulses having a modulated decay to provide uniform illumination image capture. In one case, where blocks 404 and 406 of the method 400 are repeated to provide multiple exposures, the generated light pulse may be a series of light pulses having linear decay, such as the light pulse 202 of FIGS. 2A-2C. Accordingly, the generated light pulse in this case may be in the form of a saw-tooth wave.

It should be understood that the above example is an example embodiment, is provided for illustrative purposes, and is just one of many possible applications of the example embodiment. One having ordinary skill in the art will appreciate that different exposure times may be suitable for different ranges of distances, and may be coordinated with differently modulated light pulses. For instance, a light pulse modulated with a sine (or cosine) wave may be generated by the light source, and the light sensing array may be configured such that the amount of light reflected off an image capture object within a range of distances from the image capture device and detected by a light sensing array of the image capture device may be substantially uniform. Further, variations may be implemented such that uniform illumination image capture may be provided for only image capture objects within a subset range of distances. For instance, referring to FIG. 1, an embodiment may be implemented such that a captured image may involve uniform illumination of only objects within the subset range of distances $d_1$ to $d_2$, while objects between the image capture device and the distance $d_1$ appear darker. Other examples and configurations may also be possible.

Figure 5:
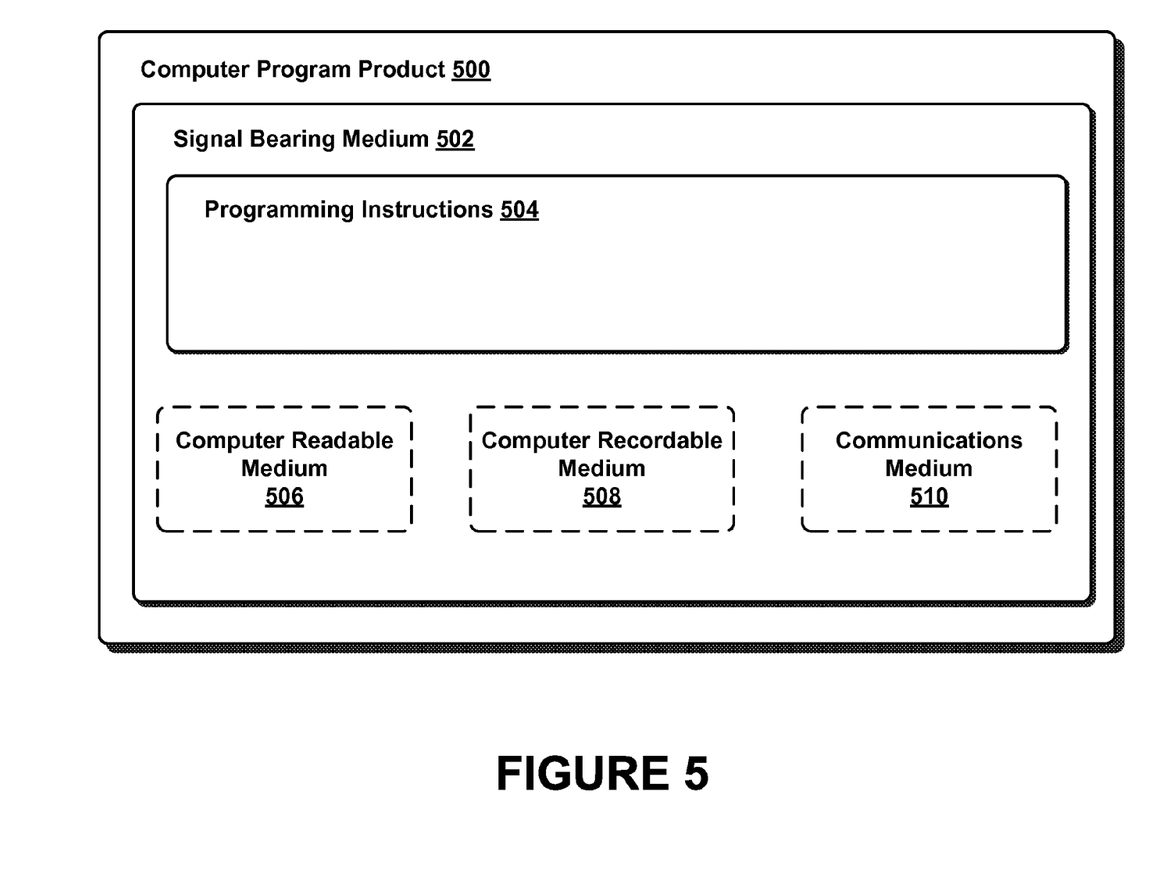
FIG. 5 is a computer-readable medium, in accordance with an example embodiment.

In some embodiments, the disclosed methods may be implemented by computer program instructions encoded on a non-transitory computer-readable storage media in a machine-readable format, or on other non-transitory media or articles of manufacture. FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described with respect to FIG. 2. In some examples, the signal bearing medium 502 may encompass a computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computing device 116 of FIG. 1 or the computing devices 410 and 430 of FIG. 4 may be configured to provide various operations, functions, or actions in response to the programming instructions 504 conveyed to the computing devices 116, 410 or 430 by one or more of the computer readable medium 506, the computer recordable medium 508, and/or the communications medium 510.

The non-transitory computer readable medium could also be distributed among multiple data storage elements, which could be remotely located from each other. The computing device that executes some or all of the stored instructions could be a computing device such as any of those described above. Alternatively, the computing device that executes some or all of the stored instructions could be another computing device, such as a server.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method comprising:
   selecting a range of distances from an image capture device, wherein the image capture device comprises a light source and a light sensing array;
   determining a pulse length based on the range of distances;
   causing the light source to generate a light pulse with the pulse length, wherein the pulse length defines a beginning of the light pulse and an end of the light pulse, wherein the light pulse has a modulated decay that is substantially linear such that the light pulse has an intensity that decays from a maximum at the beginning of the light pulse to zero at the end of the light pulse, wherein the light pulse reflects from an object located at an object distance within the range of distances to provide a reflected light pulse; and
   using the light sensing array to sense an integrated intensity of the reflected light pulse during an exposure time, wherein the exposure time is controlled based on the range of distances and the modulated decay such that the integrated intensity of the reflected light pulse is substantially independent of the object distance.

2. The method of claim 1, wherein the exposure time is controlled by controlling a voltage across a photocathode and a micro-channel plate (MCP) of an image intensifier positioned between the object and the light sensing array.

3. The method of claim 1, wherein the light source comprises a light emitting diode (LED).

4. The method of claim 3, wherein causing the light source to generate a light pulse with a modulated decay comprises:
   causing an amount of current to be provided through the LED to generate the light pulse; and
   controlling the amount of current through the LED to modulate the decay of the light pulse.

5. The method of claim 4, wherein the LED is a laser diode, and wherein causing the light source to generate a light pulse with a modulated decay further comprises:
   causing the output of the LED to be scaled using a master oscillator power amplifier (MOPA).

6. The method of claim 1, further comprising:
   causing the light source to generate a plurality of subsequent light pulses with the modulated decay, wherein the plurality of subsequent light pulses reflect from the object located at the object distance to provide a plurality of subsequent reflected light pulse; and
   using the light sensing array to sense a respective integrated intensity of each subsequent reflected light pulse during a respective subsequent exposure time, wherein each respective subsequent exposure time is controlled based on the range of distances and the modulated decay such that the integrated intensity of the subsequent reflected light pulse sensed during the respective subsequent exposure time is substantially independent of the object distance.

7. A device comprising:
   a light source;
   a light sensing array; and
   an electronic circuit configured to:
      select a range of distances from the device;
      determine a pulse length based on the range of distances;
      cause the light source to generate a light pulse with the pulse length, wherein the pulse length defines a beginning of the light pulse and an end of the light pulse, wherein the light pulse has a modulated decay that is substantially linear such that the light pulse has an intensity that decays from a maximum at the beginning of the light pulse to zero at the end of the light pulse, wherein the light pulse reflects from an object located at an object distance within the range of distances to provide a reflected light pulse; and
      use the light sensing array to sense an integrated intensity of the reflected light pulse during an exposure time, wherein the exposure time is controlled based on the range of distances and the modulated decay such that the integrated intensity of the reflected light pulse is substantially independent of the object distance.

8. The device of claim 7, wherein the exposure time is controlled by controlling a voltage across a photocathode and a micro-channel plate (MCP) of an image intensifier positioned between the object and the light sensing array.

9. The device of claim 7, wherein the light source comprises a light emitting diode (LED).

10. The device of claim 9, wherein the electronic circuit is further configured to cause the light source to generate a light pulse with a modulated decay by:
    causing an amount of current to be provided through the LED to generate the light pulse; and
    controlling the amount of current through the LED to modulate the decay of the light pulse.

11. The device of claim 9, wherein the LED is a laser diode, and wherein the electronic circuit is further configured to cause the light source to generate a light pulse with a modulated decay further comprises:
    causing the output of the LED to be scaled using a master oscillator power amplifier (MOPA).

12. The device of claim 7, wherein the electronic circuit is further configured to:
    cause the light source to generate a plurality of subsequent light pulses with the modulated decay, wherein the plurality of subsequent light pulses reflect from the object located at the object distance to provide a plurality of subsequent reflected light pulse; and
    use the light sensing array to sense a respective integrated intensity of each subsequent reflected light pulse during a respective subsequent exposure time, wherein each respective subsequent exposure time is controlled based on the range of distances and the modulated decay such that the integrated intensity of the subsequent reflected light pulse sensed during the respective subsequent exposure time is substantially independent of the object distance.

13. A non-transitory computer readable medium having stored thereon instructions executable by a computing device to cause the computing device to perform functions comprising:
    selecting a range of distances from an image capture device, wherein the image capture device comprises a light source and a light sensing array;
    determining a pulse length based on the range of distances;
    causing the light source to generate a light pulse with the pulse length, wherein the pulse length defines a beginning of the light pulse and an end of the light pulse, wherein the light pulse has a modulated decay that is substantially linear such that the light pulse has an intensity that decays from a maximum at the beginning of the light pulse to zero at the end of the light pulse, wherein the light pulse reflects from an object located at an object distance within the range of distances to provide a reflected light pulse; and
    using the light sensing array to sense an integrated intensity of the reflected light pulse during an exposure time, wherein the exposure time is controlled based on the range of distances and the modulated decay such that the integrated intensity of the reflected light pulse is substantially independent of the object distance.

14. The non-transitory computer readable medium of claim 13, wherein the exposure time is controlled by controlling a voltage across a photocathode and a micro-channel plate (MCP) of an image intensifier positioned between the object and the light sensing array.

15. The non-transitory computer readable medium of claim 13, wherein the light source comprises a light emitting diode (LED).

16. The non-transitory computer readable medium of claim 15, wherein instructions to cause the computing device to perform the function of causing the light source to generate a light pulse with a modulated decay further comprise instructions to cause the computing device to perform functions comprising:
    causing an amount of current to be provided through the LED to generate the light pulse; and
    controlling the amount of current through the LED to modulate the decay of the light pulse.

17. The non-transitory computer readable medium of claim 15, wherein the LED is a laser diode, and wherein instructions to cause the computing device to perform the function of causing the light source to generate a light pulse with a modulated decay further comprise instructions to cause the computing device to perform functions comprising:
    causing the output of the LED to be scaled using a master oscillator power amplifier (MOPA).

18. The non-transitory computer readable medium of claim 15, further comprising instructions executable by a computing device to cause the computing device to perform functions comprising:
    causing the light source to generate a plurality of subsequent light pulses with the modulated decay, wherein the plurality of subsequent light pulses reflect from the object located at the object distance to provide a plurality of subsequent reflected light pulse; and
    using the light sensing array to sense a respective integrated intensity of each subsequent reflected light pulse during a respective subsequent exposure time, wherein each respective subsequent exposure time is controlled based on the range of distances and the modulated decay such that the integrated intensity of the subsequent reflected light pulse sensed during the respective subsequent exposure time is substantially independent of the object distance.

* * * * *